US010921461B2

(12) United States Patent
Tan (10) Patent No.: US 10,921,461 B2
(45) Date of Patent: Feb. 16, 2021

(54) METHOD AND APPARATUS FOR DETERMINING UNMANNED VEHICLE POSITIONING ACCURACY (71) Applicant: Baidu Online Network Technology (Beijing) Co., Ltd., Beijing (CN)

(72) Inventor: Chuting Tan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 174 days.

(21) Appl. No.: 15/425,109

(22) Filed: Feb. 6, 2017

(65) Prior Publication Data
US 2018/0017682 A1 Jan. 18, 2018

(30) Foreign Application Priority Data

Jul. 13, 2016 (CN) .......................... 2016 1 0551165

(51) Int. Cl.
G01S 19/47 (2010.01)
G01S 19/49 (2010.01)
(Continued)

(52) U.S. Cl.
CPC .............. *G01S 19/47* (2013.01); *G01C 21/28* (2013.01); *G01C 21/3841* (2020.08);
(Continued)

(58) Field of Classification Search
CPC .......... G01S 19/47; G01S 19/51; G01S 19/49; G01S 19/40; G01S 17/023; G01S 19/45;
(Continued)

(56) References Cited

U.S. PATENT DOCUMENTS 5,172,001 A * 12/1992 Spizzamiglio ......... G01B 11/00
250/559.2
6,378,862 B1 * 4/2002 Rebeaud ................ B65H 5/085
271/230
(Continued)

FOREIGN PATENT DOCUMENTS

CN 101609149 A 12/2009
CN 102998679 A 3/2013
(Continued)

Primary Examiner — Dale W Hilgendorf
(74) Attorney, Agent, or Firm — Knobbe, Martens, Olson & Bear LLP (57) ABSTRACT Disclosed embodiments include a method and apparatus for determining an unmanned vehicle positioning accuracy. In some embodiments, the method comprises: acquiring positioning coordinate information obtained by real-time positioning based on sensing positioning data of the unmanned vehicle; determining real coordinate information of the unmanned vehicle based on GPS (Global Positioning System) data, IMU (Inertia Measurement Unit) data and laser point cloud data of the unmanned vehicle; matching the obtained positioning coordinate information with the determined real coordinate information, and determining the positioning accuracy of the unmanned vehicle based on a matching result. According to technical solutions of some embodiments, the positioning accuracy of the unmanned vehicle can be determined with a higher accuracy, and preparation is made for determining a travel route of the unmanned vehicle based on the positioning result.

16 Claims, 5 Drawing Sheets (51) Int. Cl.
*G01S 19/51* (2010.01)
*G01S 17/86* (2020.01)
*G01C 21/00* (2006.01)
*G01S 19/45* (2010.01)
*G01C 21/28* (2006.01)
*G01S 19/40* (2010.01)

(52) U.S. Cl.
CPC .............. *G01S 17/86* (2020.01); *G01S 19/40* (2013.01); *G01S 19/45* (2013.01); *G01S 19/49* (2013.01); *G01S 19/51* (2013.01)

(58) Field of Classification Search
CPC ..... G01S 17/86; G01C 21/28; G01C 21/3841; G01C 21/30
See application file for complete search history.

(56) References Cited

U.S. PATENT DOCUMENTS

| | | | |
|---|---|---|---|
| 7,289,906 B2 * | 10/2007 | van der Merwe ... | G01C 21/165 342/357.65 |
| 9,043,072 B1 * | 5/2015 | Tisdale et al. ......... | G01C 21/28 701/408 |
| 9,046,373 B2 * | 6/2015 | Bandyopadhyay .... | G01C 17/38 |
| 9,719,801 B1 * | 8/2017 | Ferguson et al. ....... | G01S 19/40 |
| 2005/0134440 A1 * | 6/2005 | Breed .................. | B60N 2/2863 340/435 |
| 2008/0033645 A1 * | 2/2008 | Levinson et al. ...... | G01C 21/20 701/469 |
| 2010/0332125 A1 * | 12/2010 | Tan et al. ................ | G01S 19/49 701/408 |
| 2011/0054791 A1 * | 3/2011 | Surampudi et al. ... | G01C 21/30 701/472 |
| 2014/0107832 A1 * | 4/2014 | Danko ................... | B25J 9/1628 700/193 |
| 2015/0019124 A1 * | 1/2015 | Bandyopadhyay .... | G01C 17/38 701/410 |
| 2015/0153444 A1 * | 6/2015 | Nichols ................. | G01S 13/726 342/385 |
| 2015/0185025 A1 * | 7/2015 | Lacaze ..................... | G08B 1/08 701/451 |
| 2015/0219767 A1 * | 8/2015 | Humphreys ............ | G01S 19/43 342/357.26 |
| 2016/0076892 A1 * | 3/2016 | Zhou ..................... | B64C 39/024 701/3 |
| 2016/0327653 A1 * | 11/2016 | Humphreys ............ | G01S 19/48 |
| 2016/0349362 A1 * | 12/2016 | Rohr et al. ............. | G01C 21/28 |
| 2017/0344015 A1 * | 11/2017 | Song ..................... | G01S 7/4808 |
| 2018/0074176 A1 * | 3/2018 | Feng ..................... | G01S 7/497 |
| 2018/0074755 A1 * | 3/2018 | Deng ..................... | G06F 3/0611 |
| 2018/0081039 A1 * | 3/2018 | He ......................... | G01S 17/87 |
| 2018/0089536 A1 * | 3/2018 | Feng ..................... | G01S 17/023 |
| 2018/0102058 A1 * | 4/2018 | Cao ......................... | G05D 1/10 |
| 2018/0108146 A1 * | 4/2018 | Zhan ..................... | G06K 9/4604 |

FOREIGN PATENT DOCUMENTS

| | | |
|---|---|---|
| CN | 103499350 A | 1/2014 |
| WO | WO-2016197986 A1 * | 12/2016 ............... G05D 1/10 |

* cited by examiner

METHOD AND APPARATUS FOR DETERMINING UNMANNED VEHICLE POSITIONING ACCURACY

CROSS-REFERENCE TO RELATED APPLICATIONS

This application claims the benefit of Chinese Patent Application No. 201610551165.7, entitled "Method And Apparatus For Determining Unmanned Vehicle Positioning Accuracy," filed on Jul. 13, 2016, which is hereby incorporated by reference in its entirety.

TECHNICAL FIELD

The present disclosure relates to the technical field of positioning, and particularly to a method and apparatus for determining an unmanned vehicle positioning accuracy.

BACKGROUND

An unmanned vehicle, as an intelligent movable transport tool, can complete a series of driving behaviors in place of a human driver. The unmanned vehicle is a comprehensive system integrating multiple functions such as environment perception, navigation positioning and decision-making control. The navigation positioning function enables the unmanned vehicle to "learn about" its own information such as position, speed or direction so that the decision-controlling function makes a corresponding decision based on the positioning information of the unmanned vehicle, plans a travel path and ultimately controls the unmanned vehicle to run according to the decision and the path. To sum up, the positioning accuracy is a key factor affecting intelligent driving performance of the unmanned vehicle, however a method of determining unmanned vehicle positioning accuracy is currently still lacking.

SUMMARY

In view of the above, some embodiments of the present disclosure provide a method and apparatus for determining an unmanned vehicle positioning accuracy to determine the positioning accuracy of the unmanned vehicle.

According to a first aspect of some embodiments of the present disclosure, embodiments of the present disclosure provide a method of determining an unmanned vehicle positioning accuracy, comprising:

acquiring positioning coordinate information obtained by real-time positioning based on sensing positioning data of the unmanned vehicle;

determining real coordinate information of the unmanned vehicle based on GPS data, data of an Inertia Measurement Unit (IMU) and laser point cloud data of the unmanned vehicle;

matching the obtained positioning coordinate information with the determined real coordinate information, and determining the positioning accuracy of the unmanned vehicle based on a matching result.

According to a second aspect of some embodiments of the present disclosure, embodiments of the present disclosure provide an apparatus of determining an unmanned vehicle positioning accuracy, comprising:

a positioning information acquiring module configured to acquire positioning coordinate information obtained by real-time positioning based on sensing positioning data of the unmanned vehicle;

a real information determining module configured to determine real coordinate information of the unmanned vehicle based on GPS data, data of an Inertia Measurement Unit (IMU) and laser point cloud data of the unmanned vehicle;

a positioning accuracy determining module configured to match the obtained positioning coordinate information with the determined real coordinate information, and determine the positioning accuracy of the unmanned vehicle based on a matching result.

In the technical solutions provided by some embodiments of the present disclosure, the real coordinate information of the unmanned vehicle with a high accuracy is determined based on the GPS positioning data, IMU data and laser point cloud data of the unmanned vehicle, and the real coordinate information of the unmanned vehicle with a high accuracy is matched with the positioning coordinate information obtained by real-time positioning based on the sensor data of the unmanned vehicle, and the positioning accuracy of the positioning module in the unmanned vehicle is determined based on the matching result. In this way, a method can determine the positioning accuracy of the unmanned vehicle with a higher accuracy, and gets well-prepared for determining a travel route of the unmanned vehicle based on the positioning result.

DETAILED DESCRIPTION OF EMBODIMENTS

The present disclosure is described in further detail in conjunction with figures and embodiments. It may be appreciated that specific embodiments described here are only intended to illustrate the present disclosure, not to limit the present disclosure. In addition, it is noticeable that for ease of description, figures only show partial structures related to some embodiments of the present disclosure, not all structures. Although the present disclosure describes numerated embodiments, the embodiments described within each numerated embodiment may be combined or separated.

Embodiment 1

Figure 1:
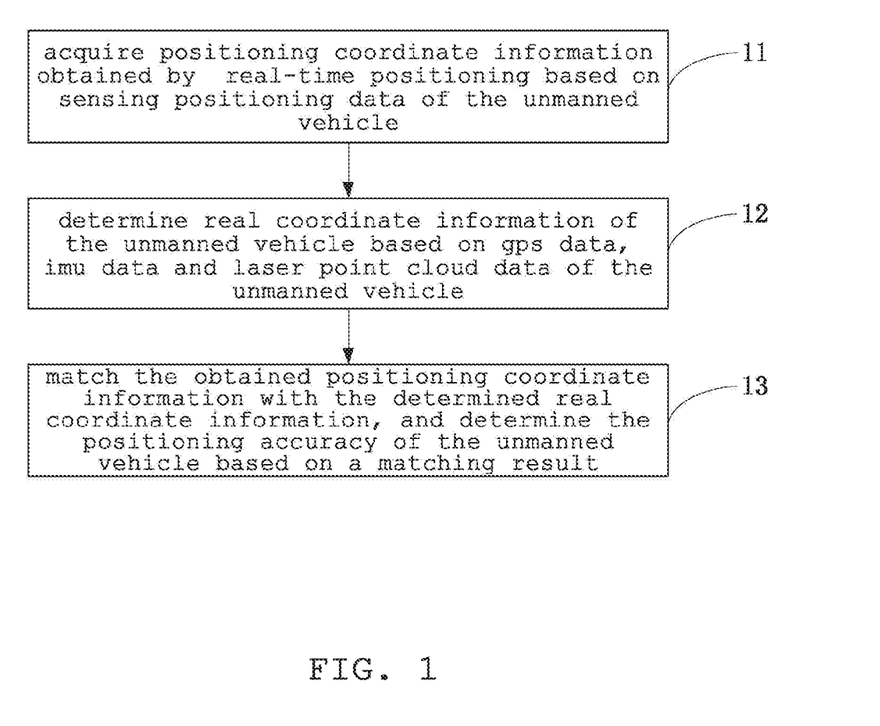
FIG. 1 is a flow chart of a method of determining an unmanned vehicle positioning accuracy according to some embodiments.

FIG. 1 is a flow chart of a method of determining an unmanned vehicle positioning accuracy according to some embodiments. The method can be executed by an apparatus for determining an unmanned vehicle positioning accuracy, the apparatus may be implemented in a hardware and/or software manner, and the method can be generally applicable for a situation of testing the unmanned vehicle positioning accuracy. Referring to FIG. 1, the method of determining the unmanned vehicle positioning accuracy according to the present embodiment may comprise the following:

S11: acquiring positioning coordinate information obtained by real-time positioning based on sensing positioning data of the unmanned vehicle.

Wherein, the sensing positioning data refers to data collected by a positioning sensor in the unmanned vehicle. Take the unmanned vehicle employing an Inertial Navigation System (INS) for positioning as an example. The positioning sensor may comprise a gyro, an acceleration sensor and the like, the sensing positioning data may comprise acceleration data and angular speed data, and the INS calculates the positioning coordinate information of next position of the unmanned vehicle from a starting point position based on continuously-measured unmanned vehicle course angle and speed, thereby continuously measuring the positioning coordinate information of the unmanned vehicle at each moment (for example, at a plurality of time intervals).

It needs to be appreciated that the positioning system in the unmanned vehicle in some embodiments of the present disclosure is not specifically limited, for example, the unmanned vehicle may use Global Positioning System (GPS) or Beidou Navigation Satellite System (BDS) for positioning.

S12: determining real coordinate information of the unmanned vehicle based on GPS data, data of the Inertia Measurement Unit (IMU) and laser point cloud data of the unmanned vehicle.

In some embodiments of the present disclosure, in the unmanned vehicle are configured a GPS module, an Inertia Measurement Unit IMU, a laser radar and the like to acquire in real time differential GPS data, IMU data and laser point cloud data during the travel of the unmanned vehicle, subsequently, to perform offline registration for the differential GPS data and laser point cloud data by using Iterative Closest Points ICP algorithm to obtain precise real coordinate information of the unmanned vehicle; and also to compare the obtained differential GPS data, IMU data and laser point cloud data with a predetermined high-accuracy map to obtain real coordinate information of the unmanned vehicle. Since the positioning accuracy of the differential GPS data may reach a centimeter level, an accuracy of the real coordinate information determined by performing offline registration for the differential GPS data in conjunction with the laser point cloud data by using the ICP algorithm is higher than the centimeter level.

S13: matching the obtained positioning coordinate information with the determined real coordinate information, and determining the positioning accuracy of the unmanned vehicle based on a matching result.

Specifically, it is feasible to compare the positioning coordinate information of the unmanned vehicle at each moment with the real coordinate information based on a timestamp, and determine the positioning accuracy of the unmanned vehicle based on differences therebetween, and determine the positioning accuracy of the unmanned vehicle to be 1 cm if 99% of the differences are smaller than or equal to 1 cm.

In the technical solution provided by some embodiments of the present disclosure, the real coordinate information of the unmanned vehicle with a high accuracy is determined based on the GPS positioning data, IMU data and laser point cloud data of the unmanned vehicle, and the real coordinate information of the unmanned vehicle with a high accuracy is matched with the positioning coordinate information obtained by real-time positioning based on the sensor data of the unmanned vehicle, and the positioning accuracy of the positioning module in the unmanned vehicle is determined based on the matching result. In this way, the method can determine the positioning accuracy of the unmanned vehicle with a higher accuracy, and gets well-prepared for determining a travel route of the unmanned vehicle based on the positioning result.

Matching the obtained positioning coordinate information with the determined real coordinate information, and determining the positioning accuracy of the unmanned vehicle based on a matching result may comprise:

matching the positioning coordinate information of the unmanned vehicle with the real coordinate information, and determining a positioning error of the unmanned vehicle;

determining the positioning accuracy of the unmanned vehicle based on the positioning error of the unmanned vehicle.

Embodiment 2

Figure 2A:
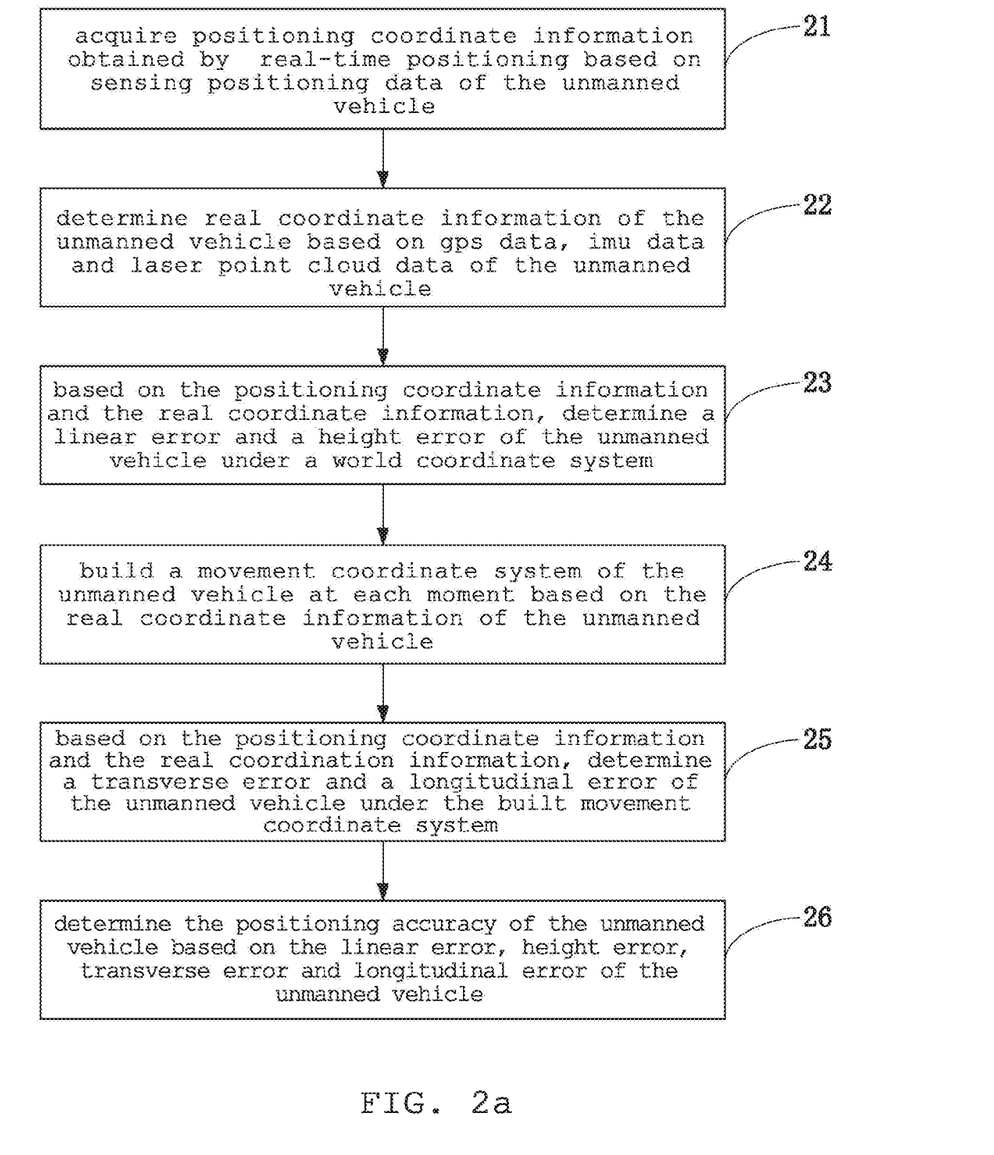
FIG. 2a is a flow chart of a method of determining an unmanned vehicle positioning accuracy according to some embodiments.

On the basis of Embodiment 1, some embodiments of the present disclosure provide a novel method of determining the positioning accuracy of the unmanned vehicle. Some embodiments of the present disclosure specifically provide a method of determining the positioning accuracy of the unmanned vehicle based on the matching result of the positioning coordinate information and the real coordinate information. FIG. 2a is a flow chart of a method of determining an unmanned vehicle positioning accuracy according to some embodiments. Referring to FIG. 2a, the method of determining an unmanned vehicle positioning accuracy according to the present embodiment may specifically comprise the following steps:

S21: acquiring positioning coordinate information obtained by real-time positioning based on sensing positioning data of the unmanned vehicle.

S22: determining real coordinate information of the unmanned vehicle based on GPS data, IMU data and laser point cloud data of the unmanned vehicle.

S23: based on the positioning coordinate information and the real coordinate information, determining a linear error and a height error of the unmanned vehicle under a world coordinate system.

Specifically, for each moment, a distance between projection of the positioning coordinate information of the unmanned vehicle at this moment on an xoy plane of the world coordinate system and projection of the real coordinate information on the xoy plane is determined, and the determined distance is considered as the linear error of the unmanned vehicle at this moment. Furthermore, for each moment, a distance of the positioning coordinate information and real coordinate information of the unmanned vehicle on z axis of the world coordinate system at this moment is determined, and the determined distance is considered as the height error of the unmanned vehicle at the moment.

S24: building a movement coordinate system of the unmanned vehicle at each moment (for example, at a plurality of time intervals) based on the real coordinate information of the unmanned vehicle.

Figure 2B:
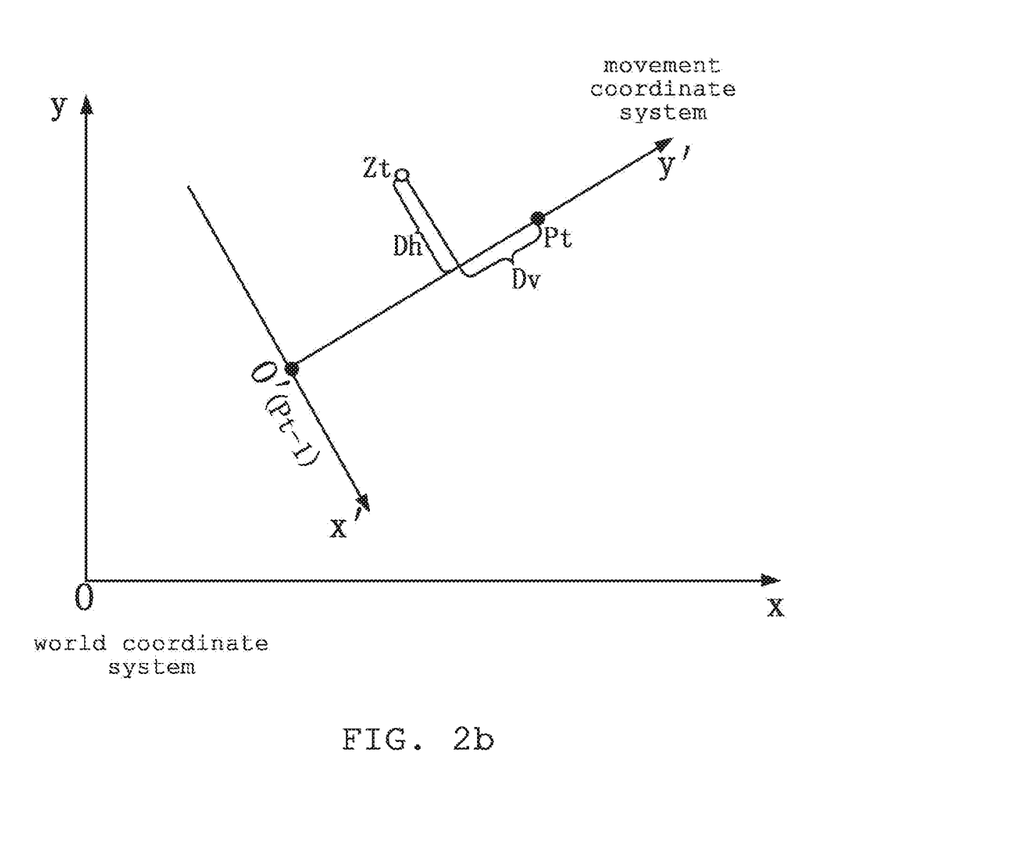
FIG. 2b is schematic diagram of an error determining procedure according to some embodiments.

Referring to FIG. 2b, for each moment, a direction from real coordinate information Pt−1 of the unmanned vehicle at a historical moment preceding this moment (e.g., a moment preceding this moment) to the real coordinate information Pt of the unmanned vehicle at this moment is considered as a longitudinal axis positive direction o'y' of the movement coordinate system of the unmanned vehicle at this moment, a direction in a horizontal direction perpendicular to the longitudinal axis positive direction o'y' is determined as a transverse axis positive direction o'x', and the transverse axis positive direction o'x' intersects with the longitudinal axis positive direction o'y' at a location of the real coordinate information Pt−1 of the unmanned vehicle at the historical moment, thereby building a horizontal plane x'o'y' of the movement coordinate system of the unmanned vehicle at each moment.

S25: based on the positioning coordinate information and the real coordination information, determining a transverse error and a longitudinal error of the unmanned vehicle under the built movement coordinate system.

Referring to FIG. 2b, for each moment, a distance Dh of projections of positioning coordinate information Zt and real coordinate information Pt at this moment on the transverse axis direction o'x' of the movement coordinate system at this moment is determined as the transverse error at this moment, and a distance Dv of projections of the positioning coordinate information Zt and real coordinate information Pt at this moment on the longitudinal axis direction o'x' of the movement coordinate system at this moment is determined as the longitudinal error at this moment.

S26: determining the positioning accuracy of the unmanned vehicle based on the linear error, height error, transverse error and longitudinal error of the unmanned vehicle.

Statistics is respectively performed for the linear error, height error, transverse error and longitudinal error of the unmanned vehicle at each moment, for example, statistics is performed for 5w-10w frame positioning data. If 99.99% of the linear error, height error, transverse error and longitudinal error obtained from the statistics are in a certain error range, the error range may be determined as the positioning accuracy of the unmanned vehicle.

In the technical solution provided by some embodiments of the present disclosure, the positioning coordinate information and real positioning information of the unmanned vehicle obtained by real-time positioning, the movement coordinate system of the unmanned vehicle is built based on the actual coordinate information, then the linear error and height error of the unmanned vehicle under the world coordinate system are determined based on the positioning coordinate information and real coordinate information of the unmanned vehicle, the transverse error and longitudinal error of the unmanned vehicle under the movement coordinate system are determined, finally, statistics is respectively performed for the linear error, height error, transverse error and longitudinal error of the unmanned vehicle, and the positioning accuracy of the unmanned vehicle is determined based on the statistics result. According to the method, the positioning accuracy of the unmanned vehicle is determined from four directions the linear error, height error, transverse error and longitudinal error, and the accuracy of the positioning accuracy is higher and gets well-prepared for determining a travel route of the unmanned vehicle based on the positioning result.

Embodiment 3

Figure 3A:
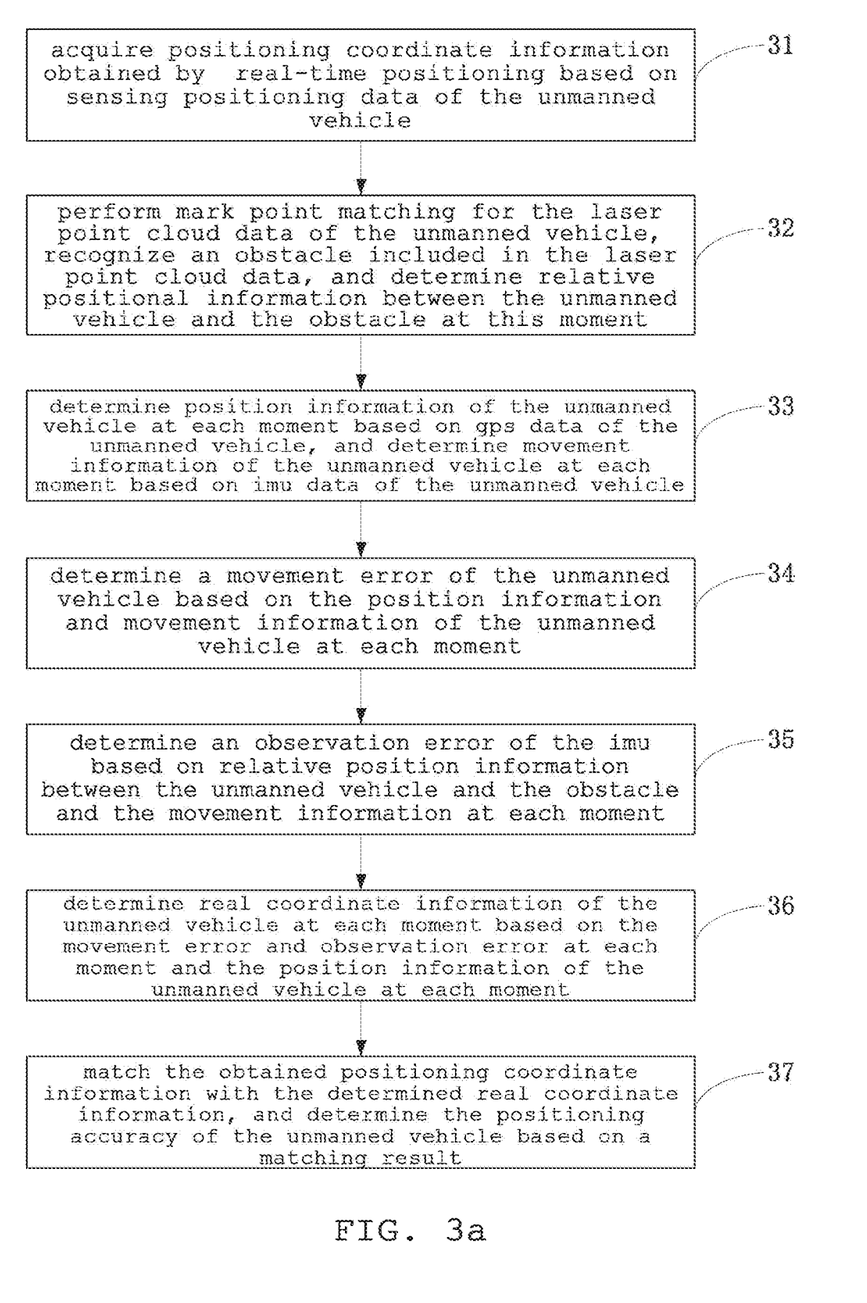
FIG. 3a is a flow chart of a method of determining an unmanned vehicle positioning accuracy according to some embodiments.

On the basis of Embodiment 1, some embodiments of the present disclosure provide a novel method of determining the positioning accuracy of the unmanned vehicle. Some embodiments of the present disclosure specifically provide a manner of determining the real coordinate information of the unmanned vehicle. FIG. 3a is a flow chart of a method of determining an unmanned vehicle positioning accuracy according to some embodiments. Referring to FIG. 3a, the method of determining an unmanned vehicle positioning accuracy according to the present embodiment may specifically comprise the following steps:

S31: acquiring positioning coordinate information obtained by real-time positioning based on sensing positioning data of the unmanned vehicle.

S32: performing mark point matching for the laser point cloud data of the unmanned vehicle, recognizing an obstacle included in the laser point cloud data, and determining relative positional information between the unmanned vehicle and the obstacle at this moment.

Figure 3B:
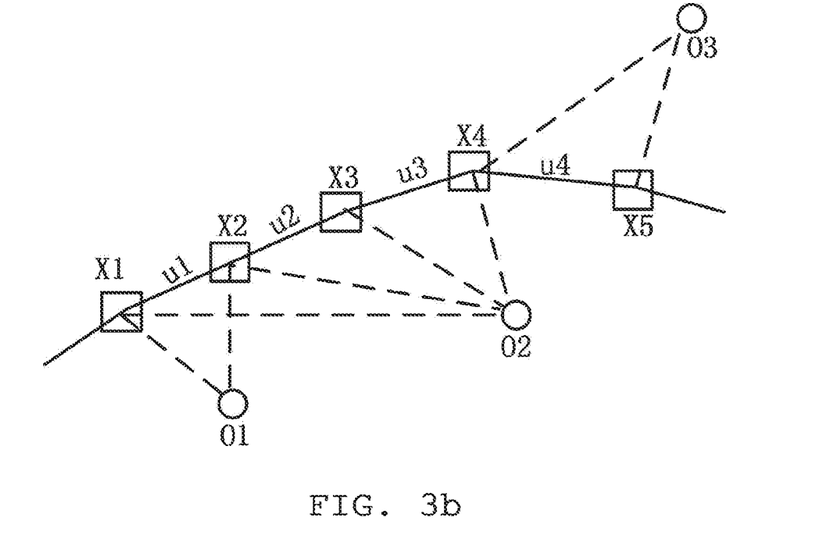
FIG. 3b is a flow chart of a procedure of determining real coordinate information of the unmanned vehicle according to some embodiments.

Specifically, referring to FIG. 3b, the ICP may be employed to perform the mark point matching for the laser point cloud data of the unmanned vehicle to obtain the obstacle O included in the laser point cloud data, and determine relative position information of the unmanned vehicle $X_t$ and the obstacle $O_i$ at each moment through the point cloud recognition, wherein t=1, 2, 3 . . . and i=1, 2, 3 . . . .

S33: determining position information of the unmanned vehicle at each moment based on GPS data of the unmanned vehicle, and determining movement information of the unmanned vehicle at each moment based on IMU data of the unmanned vehicle.

Referring to FIG. 3b, in some embodiments, it is feasible to determine position information $X_t$ of the unmanned vehicle at each moment under the world coordinate system based on the GPS data of the unmanned vehicle, and determine movement information $u_t$ of the unmanned vehicle at each moment based on the IMU data, wherein the movement information $u_t$ may be acceleration information, direction information, speed information and the like.

S34: determining a movement error of the unmanned vehicle based on the position information and movement information of the unmanned vehicle at each moment.

The determining a movement error of the unmanned vehicle based on the position information and movement information of the unmanned vehicle at each moment may comprise: determining an estimated position of the unmanned vehicle at this moment based on movement information of the unmanned vehicle at each moment and position information at a historical moment preceding this moment; and determining a movement error of the unmanned vehicle based on the position information and estimated position of the unmanned vehicle at each moment. For example, the movement error $ep_t$ of the unmanned vehicle is calculated according to the following formula: $ep_t=x_t-f(x_{t-1},u_t)$, wherein $f(x_{t-1},u_t)$ is the estimated position of the unmanned vehicle at moment t, and $x_{t-1}$ is position information of the unmanned vehicle at moment t−1.

S35: determining an observation error of the IMU based on relative position information between the unmanned vehicle and the obstacle and the movement information at each moment.

The determining an observation error of the IMU based on relative position information between the unmanned vehicle and the obstacle and the movement information at each moment may comprise: based on movement information of the unmanned vehicle at each moment and relative position information of the unmanned vehicle and the obstacle at a historical moment preceding this moment, determining an estimated relative position information of the unmanned vehicle and the obstacle at this moment; determining the observation error of the IMU based on relative position information of the unmanned vehicle and the obstacle at each moment and the estimated relative position information. For example, the observation error $eL_t$ of the IMU is calculated according to the following equation: $eL_t=z_t-g(z_{t-1},u_t)$, wherein $g(z_{t-1},u_t)$ is estimated relative position information of the unmanned vehicle and the obstacle at the moment t, $z_{t-1}$ is relative position information of the unmanned vehicle and the obstacle at the moment t−1, and $z_t$ is relative position information of the unmanned vehicle and the obstacle at the moment t.

S36: determining real coordinate information of the unmanned vehicle at each moment based on the movement error and observation error at each moment and the position information of the unmanned vehicle at each moment.

Specifically, a min error at each moment is determined according to the following formula:

$$\min\ error=\Sigma_t(ep_t)^2+\Sigma_t(eL_t)^2 \qquad 1.$$

The real coordinate information at each moment is obtained based on the position information of the unmanned vehicle at each moment and the min error, wherein the position information of the unmanned vehicle at each moment may be obtained based on the GPS data of the unmanned vehicle.

S37: matching the obtained positioning coordinate information with the determined real coordinate information, and determining the positioning accuracy of the unmanned vehicle based on a matching result.

In the technical solution provided by some embodiments of the present disclosure, the relative position information between the unmanned vehicle and the obstacle is determined by acquiring the positioning coordinate information of the unmanned vehicle obtained by real-time positioning, and recognizing the obstacle included in the laser point cloud data of the unmanned vehicle, the position information of the unmanned vehicle is determined based on the GPS data of the unmanned vehicle, and the movement information of the unmanned vehicle is determined based on the IMU data of the unmanned vehicle. Subsequently, the movement error of the unmanned vehicle is determined based on the position information and movement information of the unmanned vehicle, the observation error of the IMU is determined based on the relative position information between the unmanned vehicle and the obstacle and the movement information, and the real coordinate information of the unmanned vehicle is determined based on the position information, movement error and observation error of the unmanned vehicle, thereby improving the accuracy of the real coordinate information and therefore improving the accuracy of the positioning accuracy of the unmanned vehicle subsequently determined based on the positioning coordinate information and real coordinate information of the unmanned vehicle.

Embodiment 4

Figure 4:
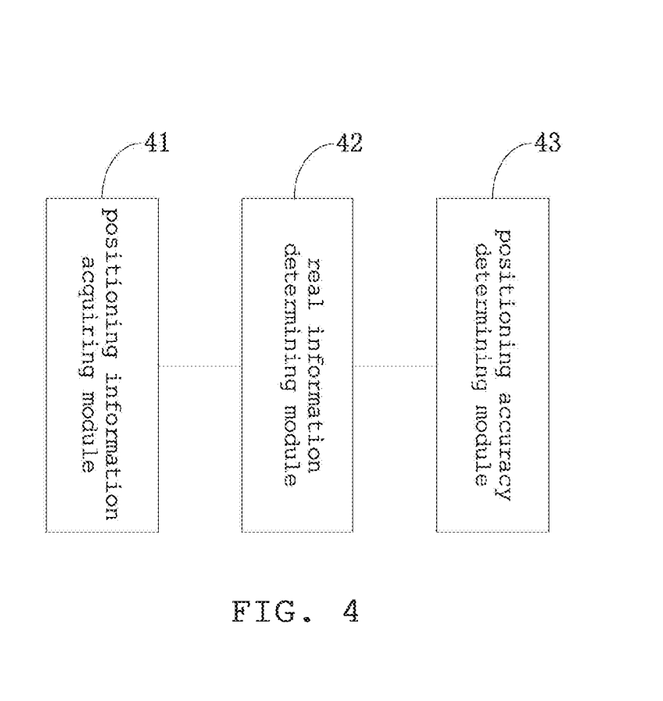
FIG. 4 is a block diagram of an apparatus of determining an unmanned vehicle positioning accuracy according to some embodiments.

FIG. 4 is a block diagram of an apparatus of determining an unmanned vehicle positioning accuracy according some embodiments. The apparatus can be applicable for a situation of testing the unmanned vehicle positioning accuracy. Referring to FIG. 4, the apparatus of determining the unmanned vehicle positioning accuracy according may include:

a positioning information acquiring module 41 configured to acquire positioning coordinate information obtained by real-time positioning based on sensing positioning data of the unmanned vehicle;

a real information determining module 42 configured to determine real coordinate information of the unmanned vehicle based on GPS data, data of an Inertia Measurement Unit (IMU) and laser point cloud data of the unmanned vehicle;

a positioning accuracy determining module 43 configured to match the obtained positioning coordinate information with the determined real coordinate information, and determine the positioning accuracy of the unmanned vehicle based on a matching result.

The positioning accuracy determining module 43 may comprise:

an error determining sub-module configured to match the positioning coordinate information of the unmanned vehicle with the real coordinate information, and determine a positioning error of the unmanned vehicle;

a positioning accuracy determining sub-module configured to determine a positioning accuracy of the unmanned vehicle based on the positioning error of the unmanned vehicle.

The error determining sub-module may comprise:

a first error unit configured to, based on the positioning coordinate information and the real coordinate information, determine a linear error and a height error of the unmanned vehicle under a world coordinate system;

a movement coordinate system unit configured to build a movement coordinate system of the unmanned vehicle at each moment based on the real coordinate information of the unmanned vehicle;

a second error unit configured to, based on the positioning coordinate information and the real coordination information, determine a transverse error and a longitudinal error of the unmanned vehicle under the built movement coordinate system.

The real information determining module 42 may comprise:

a relative position submodule configured to, perform mark point matching for the laser point cloud data of the unmanned vehicle, recognize an obstacle included in the laser point cloud data, and determine relative positional information between the unmanned vehicle and the obstacle at this moment;

a position movement submodule configured to, determine position information of the unmanned vehicle at each moment based on GPS data of the unmanned vehicle, and determine movement information of the unmanned vehicle at each moment based on IMU data of the unmanned vehicle;

a movement error submodule configured to determine a movement error of the unmanned vehicle based on the position information and movement information of the unmanned vehicle at each moment;

an observation error submodule configured to determine an observation error of the IMU based on relative position information between the unmanned vehicle and the obstacle and the movement information at each moment;

a real information submodule configured to determine real coordinate information of the unmanned vehicle at each moment based on the movement error and observation error at each moment and the position information of the unmanned vehicle at each moment.

The movement error submodule may comprise:

an estimated position unit configured to determine an estimated position of the unmanned vehicle at this moment based on movement information of the unmanned vehicle at each moment and position information at a historical moment preceding this moment;

a movement error unit configured to determine a movement error of the unmanned vehicle based on the position information and estimated position of the unmanned vehicle at each moment.

The observation error submodule may comprise:

an estimated relative position unit configured to, based on movement information of the unmanned vehicle at each moment and relative position information of the unmanned vehicle and the obstacle at a historical moment preceding this moment, determine an estimated relative position information of the unmanned vehicle and the obstacle at this moment;

an observation error unit configured to determine the observation error of the IMU based on relative position information of the unmanned vehicle and the obstacle at each moment and the estimated relative position information.

The apparatus for determining the unmanned vehicle positioning accuracy according to some embodiments of the present disclosure may implement a method of determining the unmanned vehicle positioning accuracy as described herein, may execute a method of determining the unmanned vehicle positioning accuracy according as described herein, and can include function modules and advantageous effects corresponding to the method of determining the unmanned vehicle positioning accuracy. Reference may be made to the method of determining the unmanned vehicle positioning accuracy according to any embodiment of the present disclosure for technical details not described in detail in the present embodiment.

It is appreciated that the above description relates to some embodiments of the present disclosure and utilized technical principles. Those skilled in the art appreciate that the present disclosure is not limited to specific embodiments described here. Those skilled in the art may make various obvious variations, re-adjustments and substitutions without departing from the protection scope of the present disclosure. Hence, although the present disclosure is described in detail with the above embodiments, the present disclosure is not merely limited to the above embodiments, and it, without departing from the ideas of the present disclosure, may further comprise more other equivalent embodiments. The scope of the present disclosure is defined by the appended claims. Various components disclosed and/or illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for determining an unmanned vehicle positioning accuracy, comprising:

acquiring positioning coordinate information obtained by real-time positioning based on sensing positioning data of the unmanned vehicle;

recognizing an obstacle included in laser point cloud data of the unmanned vehicle, and determining relative position information between the unmanned vehicle and the obstacle at each moment;

determining position information of the unmanned vehicle at each moment based on global positioning system (GPS) data of the unmanned vehicle, and determining movement information of the unmanned vehicle at each moment based on inertia measurement unit (IMU) data of the unmanned vehicle, wherein the determined movement information of the unmanned vehicle includes at least one of: acceleration information, direction information and speed information;

determining a movement error of the unmanned vehicle based on the position information and the determined movement information of the unmanned vehicle at each moment;

determining an observation error of the IMU based on the relative position information between the unmanned vehicle and the obstacle and the determined movement information of the unmanned vehicle at each moment;

determining the real coordinate information of the unmanned vehicle at each moment based on the movement error of the unmanned vehicle and the observation error of the IMU at each moment and the position information of the unmanned vehicle at each moment; and matching the acquired positioning coordinate information with the determined real coordinate information, and determining the positioning accuracy of the unmanned vehicle based on a matching result.

2. The method according to claim 1, wherein matching the acquired positioning coordinate information with the determined real coordinate information, and determining the positioning accuracy of the unmanned vehicle based on the matching result comprises:

matching the positioning coordinate information of the unmanned vehicle with the real coordinate information, and determining a positioning error of the unmanned vehicle; and determining the positioning accuracy of the unmanned vehicle based on the positioning error of the unmanned vehicle.

3. The method according to claim 2, wherein matching the positioning coordinate information of the unmanned vehicle with the real coordinate information, and determining the positioning error of the unmanned vehicle comprises:

determining, based on the positioning coordinate information and the real coordinate information, a linear error and a height error of the unmanned vehicle under a world coordinate system;

building a movement coordinate system of the unmanned vehicle at a plurality of time intervals based on the real coordinate information of the unmanned vehicle; and based on the positioning coordinate information and the real coordination information, determining a transverse error and a longitudinal error of the unmanned vehicle under the built movement coordinate system.

4. The method according to claim 1, wherein determining the movement error of the unmanned vehicle based on the position information and the movement information of the unmanned vehicle at each moment comprises:

determining an estimated position of the unmanned vehicle at each moment based on the movement information of the unmanned vehicle at each moment and the position information at a historical moment preceding each moment; and determining the movement error of the unmanned vehicle based on the position information and estimated position of the unmanned vehicle at each moment.

5. The method according to claim 1, wherein determining the observation error of the IMU based on the relative position information between the unmanned vehicle and the obstacle and the movement information at each moment comprises:
   determining, based on the movement information of the unmanned vehicle at each moment and the relative position information of the unmanned vehicle and the obstacle at a historical moment preceding this moment, an estimated relative position information of the unmanned vehicle and the obstacle at this moment; and
   determining the observation error of the IMU based on the relative position information of the unmanned vehicle and the obstacle at each moment and the estimated relative position information.

6. The method of claim 1, wherein the determining the real coordinate information of the unmanned vehicle at each moment based on the movement error and the observation error at each moment and the position information of the unmanned vehicle at each moment comprises:
   determining a minimum error based on the movement error and the observation error; and
   determining the real coordinate information of the unmanned vehicle at each moment based on the minimum error and the position information of the unmanned vehicle at each moment.

7. An apparatus for determining an unmanned vehicle positioning accuracy, comprising:
   at least one processor; and
   a memory storing instructions, which when executed by the at least one processor, cause the at least one processor to perform operations comprising:
   acquiring positioning coordinate information obtained by real-time positioning based on sensing positioning data of the unmanned vehicle;
   recognizing an obstacle included in laser point cloud data of the unmanned vehicle, and determining relative position information between the unmanned vehicle and the obstacle at each moment;
   determining position information of the unmanned vehicle at each moment based on global positioning system (GPS), data of the unmanned vehicle, and determining movement information of the unmanned vehicle at each moment based on inertia measurement unit (IMU) data of the unmanned vehicle, wherein the determined movement information of the unmanned vehicle includes at least one of: acceleration information, direction information and speed information;
   determining a movement error of the unmanned vehicle based on the position information and the determined movement information of the unmanned vehicle at each moment;
   determining an observation error of the IMU based on the relative position information between the unmanned vehicle and the obstacle and the determined movement information of the unmanned vehicle at each moment;
   determining the real coordinate information of the unmanned vehicle at each moment based on the movement error of the unmanned vehicle and the observation error of the IMU at each moment and the position information of the unmanned vehicle at each moment; and
   matching the acquired positioning coordinate information with the determined real coordinate information, and determining the positioning accuracy of the unmanned vehicle based on a matching result.

8. The apparatus according to claim 7, wherein matching the acquired positioning coordinate information with the determined real coordinate information, and determining the positioning accuracy of the unmanned vehicle based on the matching result comprises:
   matching the positioning coordinate information of the unmanned vehicle with the real coordinate information, and determining a positioning error of the unmanned vehicle; and
   determining the positioning accuracy of the unmanned vehicle based on the positioning error of the unmanned vehicle.

9. The apparatus according to claim 8, wherein matching the positioning coordinate information of the unmanned vehicle with the real coordinate information, and determining the positioning error of the unmanned vehicle comprises:
   determining based on the positioning coordinate information and the real coordinate information, a linear error and a height error of the unmanned vehicle under a world coordinate system;
   building a movement coordinate system of the unmanned vehicle at a plurality of time intervals based on the real coordinate information of the unmanned vehicle; and
   determining, based on the positioning coordinate information and the real coordination information, a transverse error and a longitudinal error of the unmanned vehicle under the built movement coordinate system.

10. The apparatus according to claim 7, wherein determining the movement error of the unmanned vehicle based on the position information and the movement information of the unmanned vehicle at each moment comprises:
    determining an estimated position of the unmanned vehicle at each moment based on the movement information of the unmanned vehicle at each moment and the position information at a historical moment preceding each moment; and
    determining the movement error of the unmanned vehicle based on the position information and estimated position of the unmanned vehicle at each moment.

11. The apparatus according to claim 7, wherein determining the observation error of the IMU based on the relative position information between the unmanned vehicle and the obstacle and the movement information at each moment comprises:
    determining, based on the movement information of the unmanned vehicle at each moment and the relative position information of the unmanned vehicle and the obstacle at a historical moment preceding this moment, an estimated relative position information of the unmanned vehicle and the obstacle at this moment; and
    determining the observation error of the IMU based on the relative position information of the unmanned vehicle and the obstacle at each moment and the estimated relative position information.

12. A non-transitory computer storage medium storing a computer program, which when executed by one or more processors, cause the one or more processors to perform operations comprising:
    acquiring positioning coordinate information obtained by real-time positioning based on sensing positioning data of an unmanned vehicle;
    recognizing an obstacle included in laser point cloud data of the unmanned vehicle, and determining relative position information between the unmanned vehicle and the obstacle at each moment;

determining position information of the unmanned vehicle at each moment based on global positioning system (GPS) data of the unmanned vehicle, and determining movement information of the unmanned vehicle at each moment based on inertia measurement unit (IMU) data of the unmanned vehicle, wherein the determined movement information of the unmanned vehicle includes at least one of: acceleration information, direction information and speed information;

determining a movement error of the unmanned vehicle based on the position information and the determined movement information of the unmanned vehicle at each moment;

determining an observation error of the IMU based on the relative position information between the unmanned vehicle and the obstacle, and the determined movement information of the unmanned vehicle at each moment;

determining the real coordinate information of the unmanned vehicle at each moment based on the movement error of the unmanned vehicle and the observation error of the IMU at each moment and the position information of the unmanned vehicle at each moment; and matching the acquired positioning coordinate information with the determined real coordinate information, and determining a positioning accuracy of the unmanned vehicle based on a matching result.

13. The non-transitory computer storage medium according to claim 12, wherein matching the acquired positioning coordinate information with the determined real coordinate information, and determining the positioning accuracy of the unmanned vehicle based on the matching result comprises:

matching the positioning coordinate information of the unmanned vehicle with the real coordinate information, and determining a positioning error of the unmanned vehicle; and determining the positioning accuracy of the unmanned vehicle based on the positioning error of the unmanned vehicle.

14. The non-transitory computer storage medium according to claim 13, wherein matching the positioning coordinate information of the unmanned vehicle with the real coordinate information, and determining the positioning error of the unmanned vehicle comprises:

based on the positioning coordinate information and the real coordinate information, determining a linear error and a height error of the unmanned vehicle under a world coordinate system;

building a movement coordinate system of the unmanned vehicle at a plurality of time intervals based on the real coordinate information of the unmanned vehicle; and based on the positioning coordinate information and the real coordination information, determining a transverse error and a longitudinal error of the unmanned vehicle under the built movement coordinate system.

15. The non-transitory computer storage medium according to claim 12, wherein determining the movement error of the unmanned vehicle based on the position information and the movement information of the unmanned vehicle at each moment comprises:

determining an estimated position of the unmanned vehicle at each moment based on movement information of the unmanned vehicle at each moment and the position information at a historical moment preceding each moment; and determining the movement error of the unmanned vehicle based on the position information and estimated position of the unmanned vehicle at each moment.

16. The non-transitory computer storage medium according to claim 12, wherein determining the observation error of the IMU based on the relative position information between the unmanned vehicle and the obstacle and the movement information at each moment comprises:

based on the movement information of the unmanned vehicle at each moment and the relative position information of the unmanned vehicle and the obstacle at a historical moment preceding this moment, determining an estimated relative position information of the unmanned vehicle and the obstacle at this moment; and determining the observation error of the IMU based on the relative position information of the unmanned vehicle and the obstacle at each moment and the estimated relative position information.

* * * * *

UNITED STATES PATENT AND TRADEMARK OFFICE
CERTIFICATE OF CORRECTION

PATENT NO. : 10,921,461 B2  
APPLICATION NO. : 15/425109  
DATED : February 16, 2021  
INVENTOR(S) : Chuting Tan It is certified that error appears in the above-identified patent and that said Letters Patent is hereby corrected as shown below:

In the Claims

In Column 11, Line 45, Claim 7, delete "(GPS)," and insert --(GPS)--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*